US008526417B1

(12) United States Patent
Machiraju et al.

(10) Patent No.: US 8,526,417 B1
(45) Date of Patent: Sep. 3, 2013

(54) ADAPTIVE INITIALIZATION FOR WIRELESS SCHEDULERS

(75) Inventors: Sridhar Machiraju, Oakland, CA (US); Soshant Bali, Lawrence, KS (US); Hui Zang, Burlingame, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1535 days.

(21) Appl. No.: 11/769,522

(22) Filed: Jun. 27, 2007

(51) Int. Cl.
*H04B 7/212* (2006.01)
*H04L 12/413* (2006.01)
*H04W 72/00* (2009.01)

(52) U.S. Cl.
USPC ........... 370/347; 370/447; 370/230; 370/329; 455/453; 455/450

(58) Field of Classification Search
None
See application file for complete search history.

(56) References Cited

U.S. PATENT DOCUMENTS

| | | | | |
|---|---|---|---|---|
| 2001/0053141 | A1* | 12/2001 | Periyalwar et al. | 370/337 |
| 2002/0183066 | A1* | 12/2002 | Pankaj | 455/453 |
| 2002/0191555 | A1* | 12/2002 | Borst et al. | 370/329 |

OTHER PUBLICATIONS

Jalali et al., "Data Throughput of CDMA-HDR a High Efficiency-High Data Rate Personal Communication Wireless System", IEEE 2000, pp. 1854-1858, San Diego, CA.*
A. Jalali et al., "Data Throughput of CDMA-HDR a High Efficency-High Data Rate Personal Communication Wireless System," IEEE 2000, pp. 1854-1858, San Diego, CA.
Daeyoung Park et al., "A New Wireless Packet Scheduling Algorithm based on the CDF of User Transmission Rates," GLOBECOM 2003, IEEE, pp. 528-532, Seoul National University.
Sem Borst et al., "Dynamic Rate Control Algorithms for HDR Throughput Optimization," IEEE INFOCOM 2001, pp. 976-985, Murray Hill, NJ.
Thierry E. Klien., "Avoiding Spurious TCP Timeouts in Wireless Networks by Delay Injection," IEEE Communications Society, Globecom 2004, pp. 2754-2759.
Shailesh Patil et al., "Measurement-Based Opportunistic Scheduling for Heterogeneous Wireless Systems," 2006, pp. 1-13.
Harold J.Kushner et al., "Convergence of Proportional-Fair Sharing Algorithms Under General Conditions," IEEE Transactions on wireless Communications, vol. 3, No. 4, Jul. 2004, IEEE 2004, pp. 1250-1259.
T. Bonald, "A Score-Based Opportunistic Scheduler for Fading Radio Channels," France Telecom R&D, 7 pp.
Bali et al, "A Measurement Study of Scheduler-Based Attacks in 3G Wireless Networks," Passive and Active Measurement (PAM) conference, Louvain-la-neuve, Belgium, Apr. 2007, 10 pp.

* cited by examiner

*Primary Examiner* — Jinsong Hu
*Assistant Examiner* — William Nealon

(57) ABSTRACT

A method, medium, and wireless system are provided for scheduling access terminals to prevent starvation of access terminals connected to a communication network when one or more recently-connected access terminals having limited historical information about their channel conditions request time slots to initiate network communications. The wireless system includes access terminals and base stations that communicate over the communication network. The access terminals measure channel conditions associated with communications to the base station and transmit requests that specify a desired communication rate to the base station. The base stations receive the requests from each access terminal and select an access terminal to communicate during a subsequent time slot based on, among other things, the channel conditions and weighted average functions of the communication rate corresponding to the access terminal.

19 Claims, 4 Drawing Sheets

ADAPTIVE INITIALIZATION FOR WIRELESS SCHEDULERS

INTRODUCTION

Wireless systems are configured with channel-aware or channel-unaware wireless schedulers that provide network services to access terminals. The channel-unaware wireless schedulers are configured to ensure fair access to network services by providing equal access to the network services. The channel-unaware wireless schedulers, which do not monitor channel conditions, fail to maximize communication throughput at the base station because the channel-unaware wireless schedulers may allocate access to an access terminal, when the access terminal is experiencing poor channel conditions and is unable to efficiently communicate with a base station. The channel-aware wireless schedulers overcome the shortcomings of the channel-unaware schedulers by monitoring channel conditions associated with each access terminal connected to the base station. The channel-aware wireless schedulers utilize data about the channel conditions to schedule access terminals, when the channel conditions of the access terminal support efficient transmission of communications between the base station and the access terminal.

The channel-aware schedulers maximize base station throughput when compared to the channel-unaware schedulers. However, the channel-aware schedulers are subject to problems due to access terminals communicating in a bursty manner especially upon initialization. These problems cause the channel-aware wireless schedulers to stop scheduling some access terminals in favor of providing access to other access terminals, which may lead to starvation, i.e. limited or no access to network services, of the former access terminals.

SUMMARY

The present invention is defined by the claims below. Embodiments of the present invention solve at least the above problems by providing a wireless system, a method, and computer-readable media for, among other things, scheduling access terminals in a communication network to reduce starvation while maximizing throughput. The present invention has several practical applications in the technical arts including scheduling access terminals, calculating weighted average functions of the communication rate, adaptive initialization, and preventing starvation over a communication network.

In a first aspect, a set of computer-useable instructions provide a method to schedule time slots for communications between access terminals and base stations. In accordance with the computer-useable instructions, the base stations receive initialization requests from the access terminals. The requests include a desired communication rate for the access terminals based on the current channel conditions observed by the access terminals. In turn, the base stations periodically calculate weighted average functions of the communication rate for each access terminal based on a number of time slots that occurred since the initialization of the access terminal. Based on weighted average functions of the communication rate for each access terminal and the channel conditions, the base stations schedule an access terminal for communication.

In a second aspect, a wireless system includes base stations and access terminals that communicate over a communication network. The base stations are configured to select an access terminal to communicate over the communication network for each available time slot based on a weighted average and current channel conditions corresponding to each access terminal. Each base station includes an adaptive initialization component that is configured to assign an alpha value to each access terminal. The alpha value is utilized by the base stations to calculate appropriately weighted average functions of the communication rate during initialization periods of each access terminal to prevent the access terminal from receiving an unfair number of time slots and starving other access terminals.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide wireless systems and methods for scheduling access terminals. The wireless systems are configured with channel-aware schedulers that intelligently select access terminals to communicate over the communication network. The channel-aware schedulers are configured with adaptive initialization components that assign dynamic alpha values to each access terminal. The channel-aware schedulers calculate weighted average functions of the communication for each access terminal based on, among other things, the alpha values generated by the adaptive initialization components. The alpha values enable the channel-aware schedulers to calculate weighted average functions of the communication rates during an initialization period for each access terminal. During the initialization period, the channel-aware schedulers servicing the access terminals are not equipped with large sets of historical values that represent previous communication rates of the access terminals. The alpha values provide the channel-aware schedulers with an appropriate factor for calculating weighted average functions of the communication rate for each access terminal. The use of the alpha value by the channel-aware schedulers enable the base station to avoid initialization-related starvation of the access terminals. Further, the channel-aware scheduler may improve access terminal communication experience and increases throughput and fairness for the wireless system and each access terminal.

Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media.

A wireless system includes base stations, access terminals, and a communication network that connects the base stations and access terminals. In the wireless system, the base stations are configured with wireless schedulers that select time slots to assign to the access terminals. The wireless schedulers may include channel-aware schedulers that select access terminals based on, among other things, channel conditions observed by the access terminals and weighted average functions of the communication rate associated with each access terminal.

Figure 1:
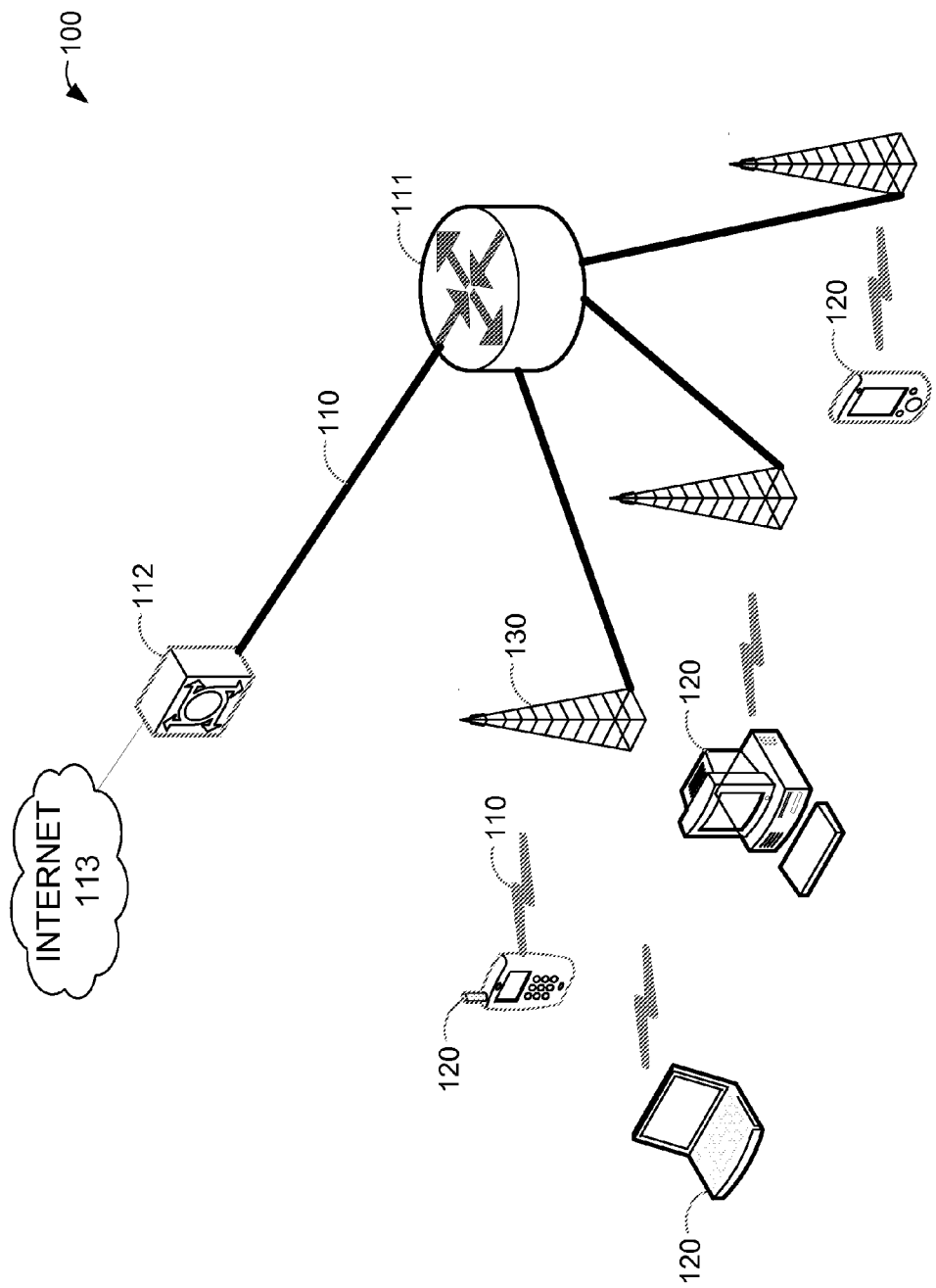
FIG. 1 is an exemplary network diagram that illustrates a wireless system.

FIG. 1 is an exemplary network diagram that illustrates a wireless system 100. The wireless system 100 includes a network 110, access terminals 120, and base stations 130.

The network 110 may include wireless and wired networks. The network 110 comprises router 111, packed data switching node 112, and the Internet 113, or any other network locations. The base stations 130 communicate with the access terminals 120 over the wireless network 110. The base stations 130 connect to the router 111 to route communications received from the access terminals 120 to the Internet 113 and to route communications from the Internet 113 to the access terminals 120. The router 111 connected to the base station 130 receives communications destined for the Internet 113 or other network locations from the base stations 130 and receives communications destined for the access terminals 120 from the Internet 113. The router 111 forwards the communications to the packed data switching node 112 that is connected to the router 111. The packet data switching node 112 receives and formats the communications and sends the formatted communication to the Internet 113 or any other location specified in the communication and vice versa.

The access terminals 120 are devices that generate or receive communication requests, i.e., voice, video, or data. The access terminals 120 include, but are not limited to, laptops, personal computers, mobile phones, personal digital assistants, smart phones, and other computing devices. In certain embodiments, the access terminals 120 monitor channel conditions on the network 110 and transmit the channel conditions to the base stations 130. The access terminals 120 also transmit requests that specify a desired communication rate to the base station 130. The access terminals 120 periodically send requests for a desired communication rate based on the current channel conditions to the base stations 130.

The base stations 130 receive the communication requests and current channel conditions from the access terminals 120. The base stations 130 are configured with wireless schedulers that select access terminals 120 to communicate in a time slot based on, among other things, the current channel conditions and weighted average functions of the communication rate associated with each access terminal. The base stations 130 schedule and select the access terminals 120 to communicate in a time slot when a specified function of the channel conditions and the weighted average functions are good in comparison with other access terminals. For example, in certain wireless schedulers: $R_i[t]$ is the current rate of ith access terminal 120 during time slot t; $A_i[t]=(1-\alpha)A_i[t-1]$ may be the weighted average function of the communication rate used for the ith access terminal 120 when the ith access terminal 120 is not scheduled in slot t; and $A_i[t]=(1-\alpha)A_i[t-1]+\alpha R_i[t]$ may be the weighted average function of the communication rate for the ith access terminal 120 when the ith access terminal 120 is scheduled in slot t. In such cases, the wireless scheduler may examine the ratio $(R_i[t]/A_i[t])$ for each access terminal 120 to select the access terminal 120 with the largest ratio. These wireless schedulers use the weighted average functions of the communication rate ($A_i[t]$) and an adaptive alpha ($\alpha$), which is further described in FIG. 2., to prevent starvation of other access terminals 120 that are not assigned to the time slot.

One of ordinary skill in the art appreciates and understands that the wireless system 100 has been simplified and that alternate arrangements are within the scope and spirit of the above description.

To prevent and minimize starvation of access terminals, the wireless schedulers utilized by the base stations are configured with an adaptive initialization component that assigns dynamic alpha values to the access terminals. Moreover, the wireless schedulers configured with the adaptive initialization component may overcome starvation caused by bursty traffic, i.e., packets received from the access terminals, or on-off behavior exhibited by the access terminals. The adaptive initialization component dynamically and adaptively assigns alpha values that are utilized by the wireless schedulers to calculate weighted average functions of the communication rate for each access terminal. Based on, among other things, the weighted average functions of the communication rate, the wireless schedulers schedule and select an access terminal to communicate during subsequent time slots.

Figure 2:
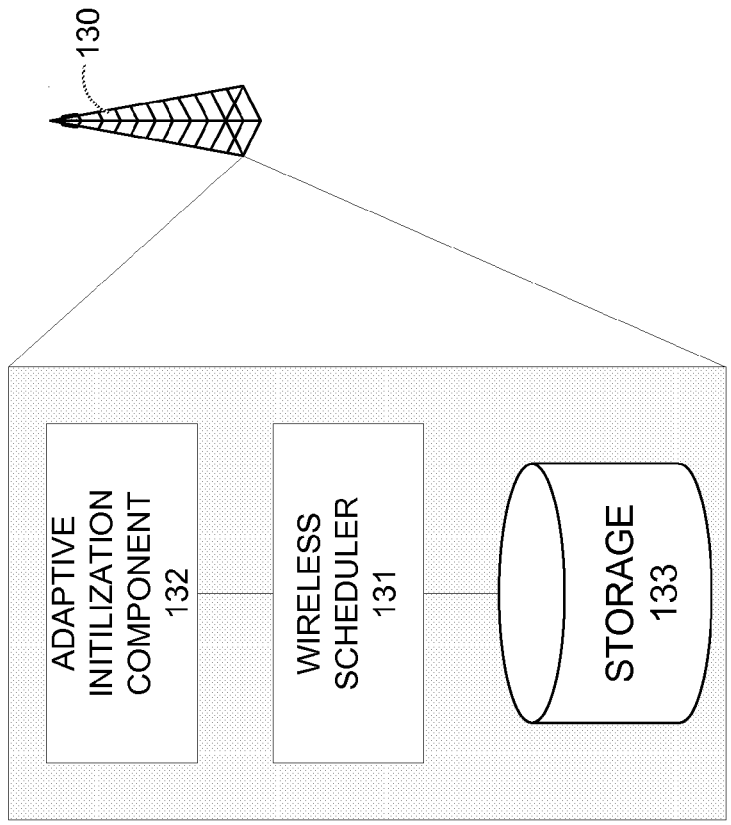
FIG. 2 is an exemplary component diagram that illustrates a base station included in the wireless system of FIG. 1.

FIG. 2 is an exemplary component diagram that illustrates a base station 130 included in the wireless system 100 of FIG. 1. The base station 130 includes a wireless scheduler 131, an adaptive initialization component 132, and storage 133.

The wireless scheduler 131 selects access terminals to communicate during time slots, based on among other things, weighted average functions of the communication rate. The wireless scheduler 131 calculates the weighted functions of the average communication rate for each access terminal by utilizing the alpha values assigned to each access terminal. The wireless scheduler 131 stores the weighted average functions of the communication rate and the alpha values corresponding to the access terminals in the storage 133.

The adaptive initialization component 132 generates and assigns alpha values ($\alpha$) to each access terminal. The alpha values are generated based on the number of time slots that transpired since the access terminal was initialized at the base station 130. When an access terminal attempts to access the communication network for the first time, or after a period of inactivity lacking historical information on communication rates, the base station 130 initializes the access terminal by creating a queue for the access terminal to store, among other things, alpha values, current rates, and weighted average functions of the communication rates for each time slot. The adaptive initialization component 132 assigns alpha values in an inverse relationship to the number of time slots that transpired since the access terminal was initialized. Thus, the adaptive initialization component 132 counts the number of time slots since initialization and assigns an alpha value of where 1/t is the number of transpired time slots for the access terminal. After an initialization period, the adaptive initialization component 132 assigns a constant alpha value. In other words, for each access terminal $\alpha=1/t$ during the initialization period and $\alpha=C$ after the initialization period where C is a constant. In certain embodiments, the constant alpha value is 1/T where the initialization period is T time slots, i.e., 1000 time slots. The alpha values allow the wireless scheduler 131 to perform comparisons between the functions, such as, $R_i[t]/A_i[t]$, based on the weighted average functions of the communication rate associated with each access terminal, including long-term access terminals and short-term access terminals. The long-term access terminals are access terminals that have been connected to base station 130 past the end of the initialization period. The short-term access terminal are access terminals that are not beyond the initialization period of connection to the base station.

The storage 133 stores data for each access terminal that is connected to the base station 130. The storage 133 includes a database, queue, or any other data structure that stores information for each access terminal. The information stored by the storage 133 may include, but is not limited to, current rate, the weighted average functions of the communication rate, and alpha values for each access terminal during each time slot after initialization.

Figure 3:
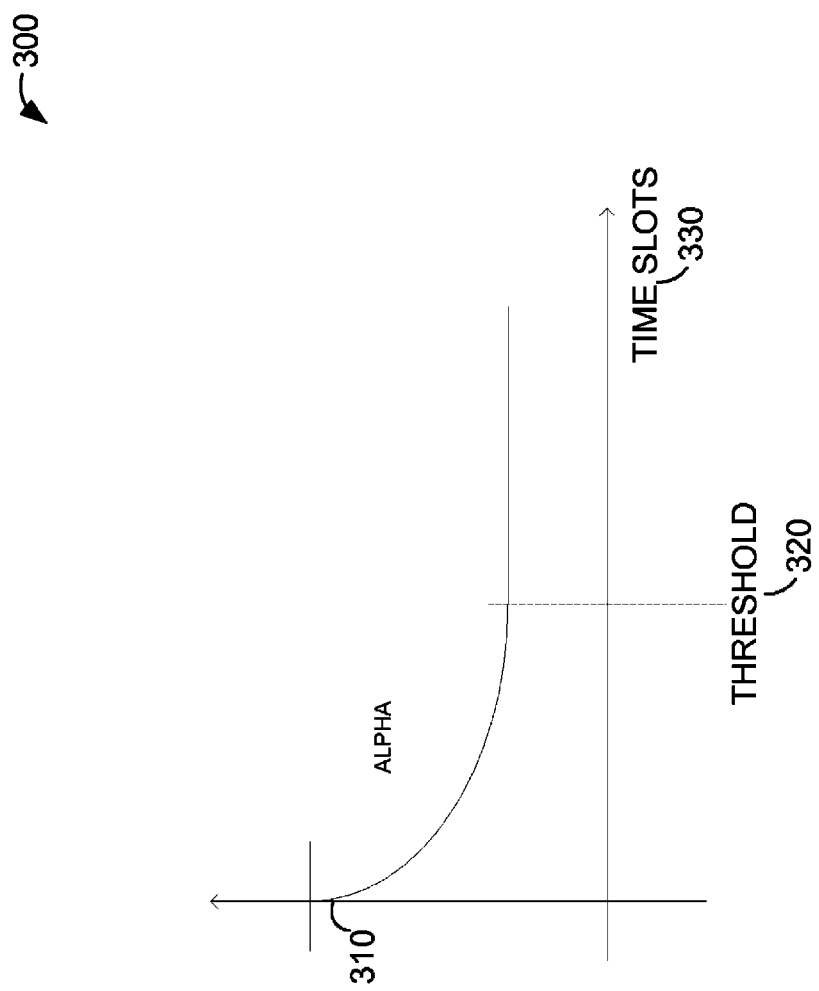
FIG. 3 is an exemplary graph that illustrates alpha values assigned to access terminals by an adaptive initialization component of a base station.

FIG. 3 is an exemplary graph that illustrates alpha values assigned to access terminals by an adaptive initialization component of a base station. The graph 300 represents the distribution of alpha values generated by the adaptive initialization component and includes an initialization value 310, a threshold value 320, and time slots 330. The alpha values are initialized with the initialization value 310. The time period between the initialization value 310 and the threshold value 320 is the initialization period. During the initialization period, the alpha values decrease inversely as the number of time slots 330 increase. After the threshold value 320, the alpha values are constant. In some embodiments, the alpha values are automatically updated, by the alpha component, when the number of time slots since the initialization value 310, i.e., 1 is less than the number of time slots associated with threshold value 320, i.e., 1000. Thus, when the access terminal is recently initialized one time slot earlier, the alpha component assigns the access terminal an alpha value of 1, in a second time slot after initialization, the access terminal is assigned an alpha value of 0.5, and the alpha component continues to update the alpha values with each subsequent time slot until the threshold 320 is passed. After the threshold 320 is passed, the alpha component assigns a constant alpha value of 0.001 to the access terminals.

In some embodiments, the wireless system includes a wireless scheduler that schedules access terminals based on, among other things, weighted average functions of the communication rate for each access terminal. When the access terminal is initialized at the base station, the wireless scheduler tracks the number of time slots that passed since the mobile was initialized. For each time slot, the base station stores the current rate for each access terminal, the weighted average functions of the communication rate for each access terminal, and the alpha values assigned to each access terminal, and other access terminal information to generate a history for each access terminal. The weighted average functions of the communication rate for each access terminal is calculated by the wireless schedulers using: an adaptive alpha value during an initialization period, where the access terminal is classified as a short term access terminal; or a constant alpha value, when the number of time slots for the access terminal passes a threshold associated with the initialization period. The adaptive alpha values enable the wireless scheduler to calculate appropriately weighted average functions of the communication rates for the long-term and short-term access terminals. Thus, the wireless scheduler causes the base station to schedule both long-term and short-term access terminals without starving the long-term access terminals in favor of the short-term access terminals or vice versa.

Figure 4:
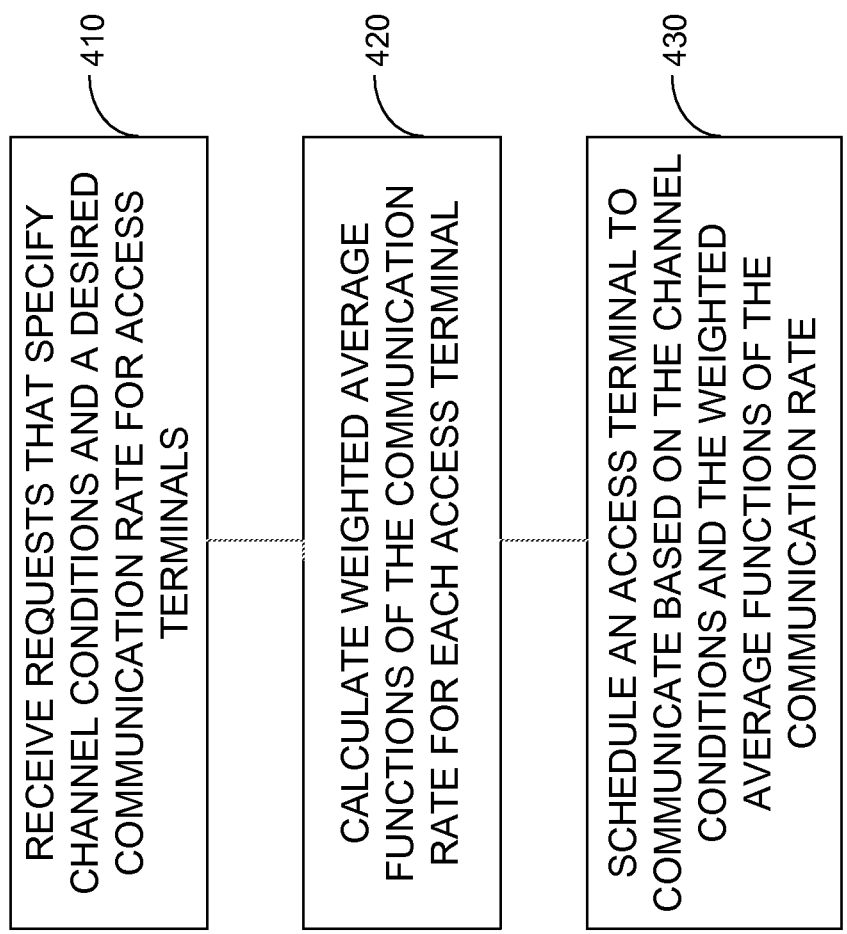
FIG. 4 is an exemplary logic diagram that illustrates a method for scheduling access terminals.

FIG. 4 is an exemplary logic diagram that illustrates a method for scheduling access terminals. Base stations communicate with the access terminals to receive initialization requests from the access terminals. In step 410, the access terminals periodically transmit requests that specify a desired communication rate based on the current channel conditions observed by the access terminal. In step 420, the base stations calculate weighted average functions of the communication rate for each access terminal based on a number of time slots that occurred since the initialization of the access terminal. In turn, the base stations schedule an access terminal to communicate during a subsequent time slot based on, among other things, the channel conditions and the weighted average functions of the communication rate associated with each access terminal, in step 430. The scheduled access terminal communicates with the base station during the subsequent time slot.

In summary, a base station configured with a channel-aware wireless scheduler calculates weighted average functions of the communication rate for both long-term and short-term access terminals in a manner that provides an average that does not unfairly bias the wireless scheduler in favor of scheduling time slots for short-term access terminals to the detriment of the long-term access terminals. An adaptive initialization component included in the base station is utilized to assign alpha values that provide an appropriate indication of the relative importance of the average calculated for the access terminal during each time slot.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer storage media having computer-useable instructions embodied thereon for performing a method to schedule time slots for communication associated with an access terminal, the method comprising:

receiving an initialization request from one or more access terminals;

receiving a request for a communication rate from the one or more access terminals at a specified interval, wherein the request includes current channel conditions measured by the one or more access terminals;

determining a number of time slots that have occurred since the initialization of each access terminal;

calculating weighted average functions of the communication rate for each access terminal based on the number of time slots that have occurred since an initialization of the access terminal; and scheduling the access terminal from the one or more access terminals to communicate during a subsequent time slot based on the channel conditions and the weighted average functions of the communication rate associated with each access terminal.

2. The non-transitory computer storage media of claim 1, further comprising, for each access terminal, storing the weighted average functions of the communication rate corresponding with each time slot.

3. The non-transitory computer storage media of claim 1, wherein when the number of time slots is below a specified threshold, the weighted average functions of the communication rate are calculated based on an alpha value that decreases as the number of time slots that occurred since the initialization of the access terminal increases.

4. The non-transitory computer storage media of claim 3, wherein the one or more access terminals are identified as short-term access terminals when the number of time slots that occurred since initialization of the one or more access terminals is below the specified threshold.

5. The non-transitory computer storage media of claim 4, wherein the one or more access terminals are identified as long-term access terminals when the number of time slots that occurred since initialization of the one or more access terminals is above the specified threshold.

6. The non-transitory computer storage media of claim 5, wherein the alpha value prevents the short-term access terminals from receiving an excessive number of time slots during an initialization period, which would otherwise reduce the number of time slots allocated to the long-term access terminals, or prevents the long-term access terminals from receiving an excessive number of slots during subsequent initialization periods, which would otherwise reduce the number of time slots allocated to the short-term access terminals.

7. A wireless base station configured with a processor to perform a method for scheduling access terminals based on a channel-aware allocation of time slots to the access terminals, the method comprising:
    receiving a request for a communication rate from one or more access terminals at a specified interval, wherein the request includes current channel conditions measured by the one or more access terminals;
    determining a number of time slots that have occurred since the initialization of each access terminal;
    generating, for each access terminal, a value that has an inverse relationship to the number of time slots that have occurred since the initialization of the access terminal;
    calculating weighted average functions of the communication rate for each access terminal based on the value;
    scheduling the access terminal from the one or more access terminals to communicate during a subsequent time slot based on the channel conditions and the weighted average functions of the communication rate associated with each access terminal; and
    communicating with the selected access terminal during the subsequent time slot.

8. The method of claim 7, further comprising, for each access terminal, storing the weighted average functions of the communication rate associated with each time slot.

9. The method of claim 7, wherein the value that has the inverse relationship is generated when the number of time slots is below a specified threshold, and when the number of time slots is above the specified threshold, the value is constant.

10. The method of claim 9, wherein the one or more access terminals are identified as short-term access terminals when the number of time slots that occurred since initialization of the one or more access terminals is below the specified threshold.

11. The method of claim 10, wherein the one or more access terminals are identified as long-term access terminals when the number of time slots that occurred since initialization of the one or more access terminals is above the specified threshold.

12. The method of claim 11, wherein the alpha value prevents the short-term access terminals from receiving an excessive number of time slots during an initialization period, which would otherwise reduce the number of time slots allocated to the long-term access terminals, or prevents the long-term access terminals from receiving an excessive number of slots during subsequent initialization periods, which would otherwise reduce the number of time slots allocated to the short-term access terminals.

13. A wireless system to schedule time slots for access terminals, the wireless system comprising:
    one or more access terminals to communicate over a communication network; and
    one or more base stations configured to select an access terminal from the one or more access terminals to communicate over the communication network for each time slot based on
    (A) weighted average functions of the communication rate that are based on alpha values assigned to the one or more access terminals, and
    (B) current channel conditions associated with each access terminal,
    wherein the one or more base stations include alpha components that are configured, for each access terminal,
    (A) to assign a dynamic alpha value that decreases as the number of previous time slots since initialization of the access terminal increases, when the number of previous time slots since initialization of the access terminal is below a specified threshold, and
    (B) to assign a constant alpha value when the number of previous time slots is above the specified threshold.

14. The wireless system of claim 13, further comprising, a storage device to store the weighted average functions during each time slot for each access terminal.

15. The wireless system of claim 13, wherein the one or more base stations utilize the alpha values received from the alpha component to calculate the weighted average functions for each access terminal.

16. The wireless system of claim 13, wherein the one or more base stations are channel-aware and utilize the alpha values to prevent starvation of short-term or long-term access terminals during an initialization period of one or more access terminals.

17. The wireless system of claim 13, wherein the one or more access terminals send requests that specify a desired communication rate to the base station.

18. The wireless system of claim 13, wherein an access terminal includes one of a mobile phone, laptop, personal digital assistant, or a personal computer.

19. The wireless system of claim 13, wherein one or more of the access terminals transmit packet traffic.

* * * * *